(12) United States Patent
Lutterbach (10) Patent No.: US 10,661,195 B2
(45) Date of Patent: *May 26, 2020

(54) DISTILLATION PROCESSES, DISTILLATION UNITS, AND SYSTEMS THEREFOR

(71) Applicant: Rickey S. Lutterbach, Long Beach, IN (US)

(72) Inventor: Rickey S. Lutterbach, Long Beach, IN (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/603,822

(22) Filed: May 24, 2017

(65) Prior Publication Data

US 2017/0340987 A1 Nov. 30, 2017

Related U.S. Application Data

(60) Provisional application No. 62/341,372, filed on May 25, 2016.

(51) Int. Cl.

| | | |
|---|---|---|
| *B01D 3/14* | (2006.01) | |
| *B01D 1/00* | (2006.01) | |
| *B01D 3/06* | (2006.01) | |
| *B01D 5/00* | (2006.01) | |
| *C02F 1/14* | (2006.01) | |

(Continued)

(52) U.S. Cl.
CPC ............ *B01D 3/143* (2013.01); *B01D 1/0076* (2013.01); *B01D 1/0082* (2013.01); *B01D 1/0088* (2013.01); *B01D 3/065* (2013.01); *B01D 3/10* (2013.01); *B01D 3/146* (2013.01); *B01D 5/0003* (2013.01); *B01D 5/0051* (2013.01); *C02F 1/048* (2013.01); *C02F 1/14* (2013.01); *C02F 1/18* (2013.01); *C02F 2201/007* (2013.01);

(Continued)

(58) Field of Classification Search
CPC ... C02F 1/048; C02F 1/14; C02F 1/18; B01D 1/0076; B01D 1/0082; B01D 1/0088; B01D 3/065; B01D 3/10; B01D 3/143; B01D 3/146; B01D 5/0003; B01D 5/0051
See application file for complete search history.

(56) References Cited

U.S. PATENT DOCUMENTS 3,948,734 A * 4/1976 Kohl ...................... B01D 3/065
202/173
4,046,637 A * 9/1977 Sasaki .................... B01D 3/00
202/174

(Continued)

OTHER PUBLICATIONS

International Search Report dated Sep. 7, 2017 for PCT/US17/34395.

*Primary Examiner* — Jonathan Miller
(74) *Attorney, Agent, or Firm* — Hartman Global IP Law; Gary M. Hartman; Domenica N. S. Hartman (57) ABSTRACT

Processes and systems suitable for purifying or otherwise treating liquids to remove contaminants therein, including but not limited to contaminated water, to permit reclaiming, recycling, and reuse of the liquids. Such a process and system entails the use of a cascading distillation system that evaporates a liquid from the feedstock and then condenses and collects a more purified form of the liquid. The cascading distillation system can be operated to selectively process the feedstock through any of a series of vessels at which different amounts and/or contaminants may be removed from the feedstock.

16 Claims, 5 Drawing Sheets

(51) Int. Cl.
  *B01D 3/10* (2006.01)
  *C02F 1/04* (2006.01)
  *C02F 1/18* (2006.01)

(52) U.S. Cl.
  CPC ....... *C02F 2201/008* (2013.01); *Y02A 20/212* (2018.01); *Y02W 10/37* (2015.05)

(56) References Cited

U.S. PATENT DOCUMENTS

| | | | |
|---|---|---|---|
| 4,330,373 A * | 5/1982 | Liu | B01D 3/065 202/174 |
| 6,514,406 B1 * | 2/2003 | Katehis | C02F 1/04 202/182 |
| 7,862,692 B2 | 1/2011 | Hong | |
| 7,922,874 B2 * | 4/2011 | Ophir | B01D 1/26 202/174 |
| 8,776,522 B2 * | 7/2014 | Schubert | C02F 1/048 60/671 |
| 9,327,997 B1 * | 5/2016 | Kuper | C02F 1/048 |
| 9,499,413 B2 * | 11/2016 | Schmidt | B01D 1/0082 |
| 2010/0192944 A1 * | 8/2010 | Gruber | B01B 1/005 126/698 |
| 2014/0021031 A1 | 1/2014 | Koivusaari et al. | |
| 2014/0299460 A1 | 10/2014 | Al-Maaitah | |
| 2015/0014147 A1 * | 1/2015 | Roth, Jr. | C02F 1/14 203/11 |
| 2015/0157953 A1 | 6/2015 | Duesel, Jr. | |

* cited by examiner

DISTILLATION PROCESSES, DISTILLATION UNITS, AND SYSTEMS THEREFOR

CROSS REFERENCE TO RELATED APPLICATIONS

This application claims the benefit of U.S. Provisional Application No. 62/341,372, filed May 25, 2016, the contents of which are incorporated herein by reference.

BACKGROUND OF THE INVENTION

The present invention generally relates to systems and processes for performing liquid treatments, as examples, liquid purification and recovery to permit reclaiming, recycling, and reuse of a liquid. The invention particularly relates to systems and processes capable of reclaiming water from contaminated water or other feedstocks, including but not limited to wastewater, industrial water, groundwater, flood and surface water, seawater, brackish water, and agriculture water.

There are many technologies that exist to purify and treat contaminated water for reintroduction into rivers, lakes, irrigation, mechanical equipment, or a municipal water system for human consumption. For example, it is advantageous to recover water from various sources, for example wastewater, industrial water, groundwater, flood and surface waters, seawater, brackish water, and agriculture water, especially in regions of the world where fresh water is not regularly available or is unavailable due to a catastrophic event, such as a hurricane, tsunami, earthquake, etc. Such locations include desert regions, near sea coasts, or remote locations that do not have significant or sufficient surface water or access to surface water, locations where groundwater must be transported by truck, and locations where investment in deep well construction may not be possible or practical due to physical site limitations such as mountains, slopes, or unstable soil conditions. Various treatment technologies have benefits and shortcomings, depending on the raw water quality, location, energy cost, capital cost, end use of the recovered water, and the ease of operation.

Existing and conventional liquid purification and treatment methods require a large amount of energy, high pressure, and/or large equipment footprints and site infrastructure. Consequently, such methods are expensive to build, operate, and maintain. Moreover, the equipment required used to perform existing and conventional purification and treatment methods do not provide versatility regarding the degree to which a particular liquid can be purified.

In view of the above, there exists a need for processes and systems that are capable of purifying or otherwise treating liquids, including but not limited to contaminated water, for the purpose of reclaiming, recycling, and reuse thereof. It would be particularly desirable if such processes and systems offered versatility regarding the extent to which liquids can be purified so as to enable the process to be tailored and controlled in terms of the type of liquid being processed, the extent of its contamination, and the desired purity of the resulting liquid for a particular end use or destination, as well as versatility as to the locations and environments in which such systems can be used.

BRIEF DESCRIPTION OF THE INVENTION

The present invention provides processes and systems suitable for purifying or otherwise treating liquids to remove contaminants therein, including but not limited to contaminated water, to permit reclaiming, recycling, and reuse of the liquid.

According to one aspect of the invention, a process is provided for distilling a liquid feedstock that may contain any of a wide variety of contaminants. The process entails the use of a cascading distillation system that evaporates a liquid from the feedstock and then condenses and collects a more purified form of the liquid. The cascading distillation system can be operated to selectively process the feedstock through any of a series of vessels at which different amounts and/or contaminants may be removed from the feedstock.

According to another aspect of the invention, a distillation system is provided that is capable of performing the above-noted steps.

Optional aspects of the invention include operating the system at pressure levels below atmospheric pressure to enable the feedstock to be evaporated at a relatively lower temperature than otherwise possible.

Technical aspects of the processes and apparatus described above preferably include the ability to produce a liquid that is sufficiently purified for its intended end use, while requiring relatively lower amounts of energy to do so. In addition, such processes and systems offer the ability to provide purification at various selective levels as desired by the end user's requirements, rather than being limited to a fully distilled liquid end product. Moreover, preferred processes and systems of this invention preferably do not require large amounts of capital for construction, promote high ratios of gallons of treated feedstock to equipment footprint, and versatility as to being able to transport and place the system near the source of feedstock.

Other aspects and advantages of this invention will be further appreciated from the following detailed description.

BRIEF DESCRIPTION OF THE DRAWINGS

FIG. 3 schematically represents a plan view of a distillation vessel of the system of FIGS. 1 and 2, and FIGS. 4 and 5 are cross-sectional views of the vessel of FIG. 3 taken along section lines A-A and B-B, respectively.

DETAILED DESCRIPTION OF THE INVENTION

The present invention encompasses distillation systems, processes, and equipment for removing one or more contaminants from a feedstock through a series of distillation steps, with the result that the feedstock is purified or otherwise treated to permit reclaiming, recycling, and/or reuse of a liquid within the feedstock. The various forms of the word "distill" will be used herein to describe processes performed by the systems shown in the drawings to indicate that the processes entail heating, evaporation, and condensation to obtain a purer form of a liquid contained in a feedstock. The feedstock may be obtained from a variety of sources, including but not limited to wastewater, tracking water, groundwater, flood and surface water, seawater, brackish water, storm water, fertigation, and agriculture water, though feedstocks containing liquids other than water can also be treated in accordance with the invention. Contaminants removed from the feedstock may be one or more of arsenic, lead, calcium, boron, magnesium, and/or essentially any other elements of the periodic table, salt and other naturally-occurring and synthetic inorganic compounds, oils, fatty acids and other naturally-occurring and synthetic organic compounds, volatile compounds including refrigerants, solvents, lubricating fluids, hydraulic fluids, and fuels, radioactive particles, bacteria, viruses, or a wide variety of other compounds or matter that may be considered a contaminant with respect to the desired end use for the treated liquid produced by the distillation system and process.

The distillation system comprises multiple distillation vessels (tanks) fluidically connected in series to yield what will be referred to as a cascading distillation system. Within a first of the vessels, the feedstock undergoes heating, evaporation, and condensation to yield a first distilled portion of the feedstock liquid. Within one or more subsequent vessels in the series, one or more distilled portions of the feedstock liquid obtained from one or more upstream vessels undergoes additional heating, evaporation, and condensation, ultimately yielding a treated liquid having a desired level of purity, in other words, a contaminant content below a prescribed level for the intended end use of the liquid. For example, depending on its intended use, water distilled from a feedstock may be potable or nonpotable. As such, the treated liquid ultimately produced by the distillation system may be partially or completely free of contaminants, e.g., salt in the case of seawater, or heavy metals in the case of industrial wastewater. Alternatively, a feedstock may be processed so that the resulting treated liquid intentionally contains one or more contaminants, for example, salt for conductivity in mechanical equipment.

The operation of the cascading distillation system can preferably be performed at temperatures that are lower than the boiling temperature of the liquid at atmospheric conditions by reducing the pressure within at least some of the vessels to something less than atmospheric pressure. Heating, evaporation, and condensation of distilled portions of the feedstock liquid can be promoted by configuring and equipping the vessels in accordance with nonlimiting but preferred aspects of the invention. Ultimately, a preferred but nonlimiting aspect of the invention is the ability to provide an improved and efficient process for recovering or reclaiming a liquid from a wide variety of feedstocks, and that the recovered liquid meets the specific requirements of the end user, regardless of the source of the feedstock.

Other preferred but nonlimiting aspects of the invention include the ability to configure the distillation system to be usable as a unit of a larger system, as nonlimiting examples, a mobile system that can be towed or otherwise transported or a modular system that comprises multiple skid-mounted distillation systems such that the modular system is scalable in size for different production level capabilities. As such, an entire mobile or modular system comprising one or more distillation systems, or an individual distillation system, or individual components (for example, vessels) of a distillation system can be moved from location to location for short term or long term use. Individual distillation systems and mobile and modular systems comprising one or more distillation systems may also achieve relatively low capital costs and/or maintenance costs and have a relatively small footprint.

Figure 1:
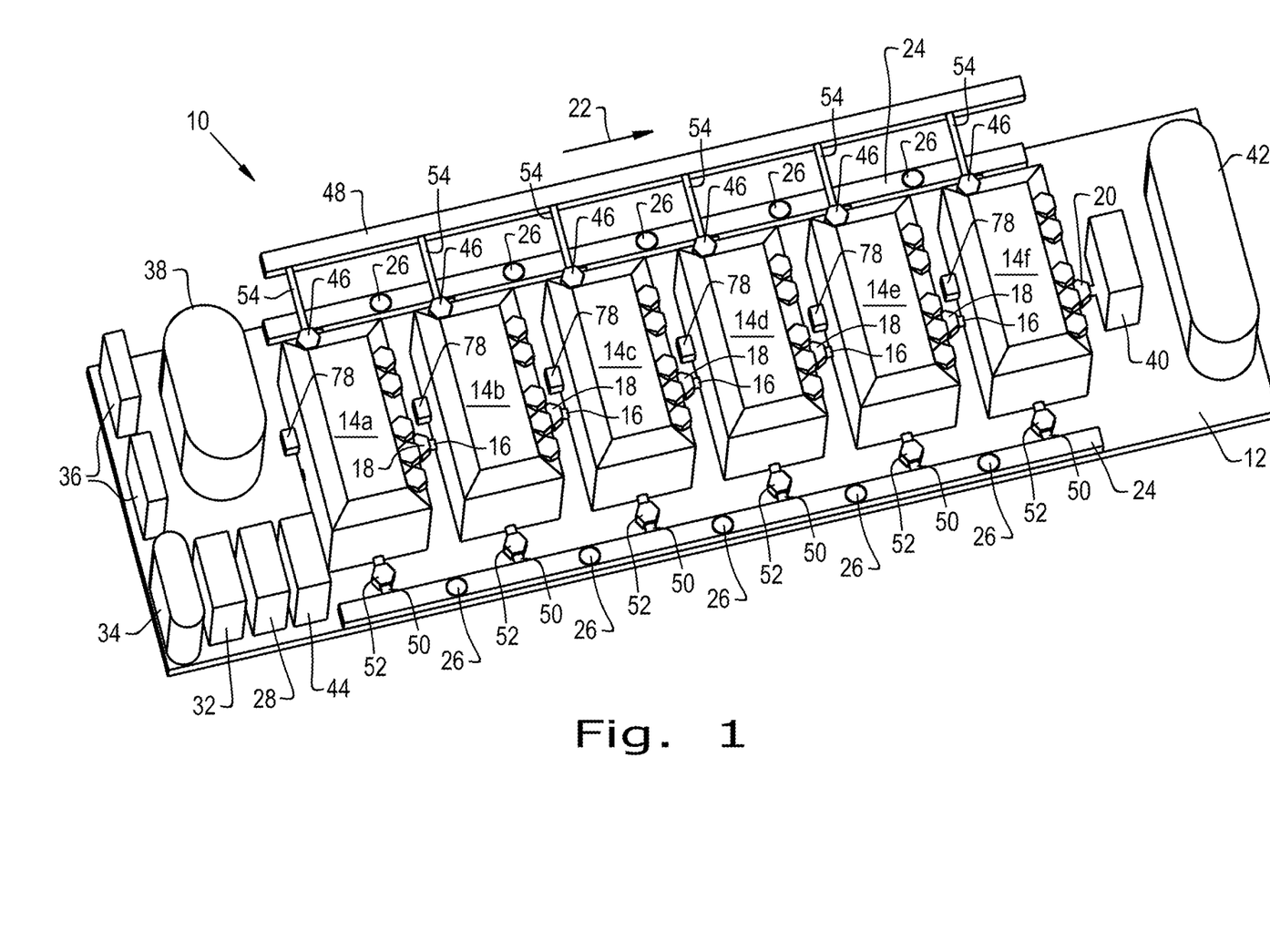
FIGS. 1 and 2 schematically represent perspective and plan views, respectively, of a distillation system in accordance with a nonlimiting embodiment of the present invention.
Figure 2:
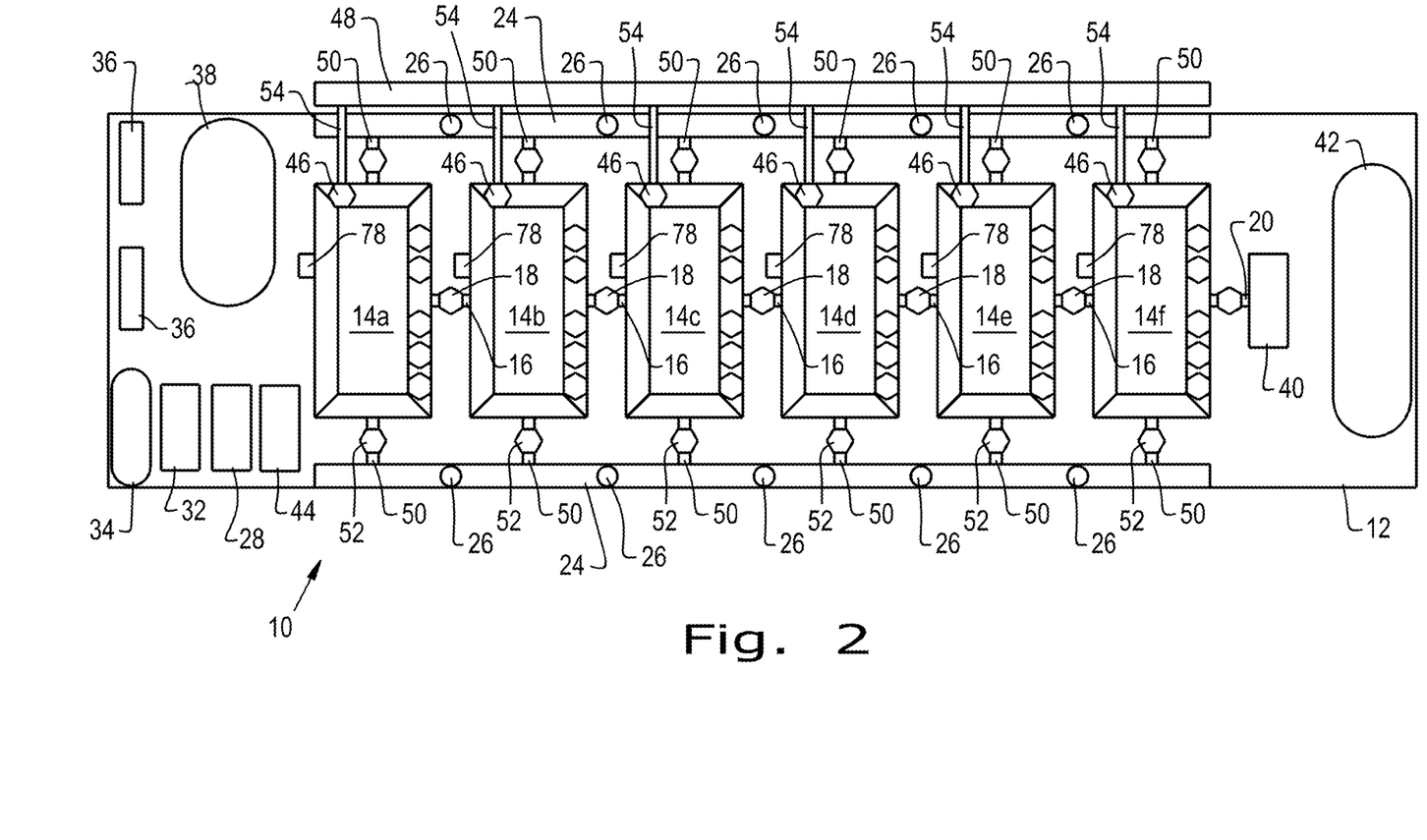

With reference to FIGS. 1 and 2, a nonlimiting embodiment of a cascading distillation system 10 is represented as being constructed and supported on a platform 12. The system 10 comprises a series of tanks or vessels. The vessels are individually identified as 14a, 14b, 14c, 14d, 14e, and 14f and collectively identified with reference number 14 in the drawings. Each vessel 14 is closed except for specific required entrance and exit points, for example, pipes or channels that transport the feedstock and distilled portions of the feedstock liquid to or from the vessels 14. The vessels 14 are connected in fluidic series with inter-vessel pipes 16 that connect each vessel 14 to at least one other vessel 14 in the series. Flow of a feedstock through the vessels 14 is initiated with the vessel 14a and, as will be explained below, continues through any one or more of the downstream vessels 14b-f toward an outlet 20 of the series to define what is referred to herein as the flow direction 22 of the system 10. As will also be explained, flow through the vessels 14 may terminate at any of the downstream vessels 14b-f prior to the series outlet 20. Each inter-vessel pipe 16 is equipped with a valve 18 to selectively permit and prevent flow between immediately adjacent pairs of vessels 14. The vessels 14 are also fluidically interconnected through at least one and preferably at least two channels 24, which are also equipped with valves 26 along their respective lengths. In combination, the inter-vessel pipes 16, channels 24, and their valves 18 and 26 enable flow from any vessel 14 in the series to be routed to any downstream vessel 14 in the series, and enable flow from any vessel 14 in the series to be routed to the outlet 20 of the series.

The distillation system 10 is illustrated in FIGS. 1 and 2 as further comprising additional equipment for handling the feedstock prior to its entry into the vessels 14, handling the feedstock after it exits the series of vessels 14, and controlling the overall operation of the system 10 and its individual vessels 14. Electrical power for the operation of the system 10 is provided with a power source 28. The particular type of power source 28 used will depend on where the system 10 is deployed, and may encompass electricity generated by or otherwise available from generators, batteries, wind turbine, solar, hydro-electric, or power available from the local electrical grid. The distillation process performed by the vessels 14 can be automated and controlled by a suitable control unit, for example, a programmable logic controller (PLC), located in a control panel 32, which can control the operation of the valves 18 and 26 as well as control or process the outputs of various other devices, nonlimiting examples of which include switches (for example, limit switches), sensors (for example, temperature and pressure sensors), and thermal devices (for example, heaters and coolers) located within or otherwise associated with the vessels 14. Alternatively or in addition, the system 10 or certain aspects of its operation may be manually controlled. The control panel 32 may display various information concerning the operation of the system 10 and certain devices of the system 10, along with indicators and warning lights so that an operator can quickly identify if a device or the system 10 as a whole is operating outside a prescribed range or is otherwise exhibiting some type of operating anomaly.

FIGS. 1 and 2 schematically represent a source 34 of the feedstock, though as previously noted feedstocks processed with the system 10 can come from a wide variety of sources. The feedstock preferably passes through one or more pre-filters 36 to reduce the amounts of particulates that enter the vessels 14, and may then be optionally held in a feedstock holding tank 38 before being delivered to the first vessel 14a. Nonlimiting examples of pre-filters 36 include sand filters capable of filtering particles of about 10 micrometers or less. The feedstock within the holding tank 38 may be treated to dissolve certain contaminants, and/or microorganisms can be added to the tank 38 to initiate or promote the purification of the feedstock. The holding tank 38 may be equipped to preheat the feedstock prior to entering the first distillation vessel 14a. Suitable heat sources for this purpose include but are not limited to burners, inline heaters, and solar panels. The feedstock can be delivered from the tank 38 to the first vessel 14a by various means, including gravity feed or with a pump.

From the series outlet 20, flow preferably progresses through a post-filter 40 before continuing to a holding tank 42 for what will be referred to as the treated liquid, which is the combined amount of distilled portions of the feedstock liquid that have been reclaimed from the feedstock. The post-filter 40 is preferably capable of removing minute contaminants from the treated liquid. The post-filter 40, holding tank 42, or additional equipment may be adapted to treat certain potentially unappealing characteristics of the treated liquid, for example, the color of the treated liquid. From the holding tank 42, the treated liquid can be pumped to a different onsite storage vessel or to any other suitable destination, as nonlimiting examples, a river, lake, irrigation system, mechanical equipment, or municipal water system.

FIGS. 1 and 2 further represent the distillation system 10 as comprising an optional vacuum pump 44 to enable the system 10, or at least one or more of its individual vessels 14, to operate under a pressure that is less than the local atmospheric pressure. The intent of operation at a sub-atmospheric pressure is to reduce the operating costs of the system 10 by reducing the energy required to evaporate the liquid from the feedstock. In particular, by maintaining a pressure of less than atmospheric pressure within the vessels 14, the boiling point temperature of the liquid being distilled from the feedstock is lowered. In the case of water, whose standard atmospheric boiling temperature is 212° F. (100° C.), the boiling temperature of water within the vessels 14 can be reduced to a temperature of about 180° F. to 200° F. (about 80 to 95° C.) or less by reducing the pressure within the vessels 14 to about 2 to 10 psia (about 140 to 690 mbar). Because evaporation is able to occur at lower temperatures within the vessels 14, preheating of the feedstock with the holding tank 38 before the feedstock enters the first vessel 14a can be particularly advantageous for aiding in a more rapid evaporation rate within the first vessel 14a.

The vacuum pump (or pumps) 44 may be individually connected to each vessel 14 or, as discussed below, can be used to reduce the pressure in a larger container in which the distillation system 10 is operating. Pressure sensors (not shown) may be used in combination with the control unit to regulate and maintain a desired pressure level within the vessels 14. The vacuum pump 44 may also be used to exhaust trace amounts of uncondensed vapors and gases that are generated in the vessels 14 and cannot be released into the atmosphere. A variety of rotary vacuum pumps can be used by the system 10 to maintain a wide range of sub-atmospheric pressures, depending on the properties of the liquid and any volatile contaminants in the feedstock.

In some embodiments, a fugitive vapor capture device 46 may be employed to capture fugitive vapors (uncondensed) of the liquid within the vessels 14 and deliver the vapors to a vapor collector 48 through a pressure-release valve (now shown). The vapor capture device 46 may comprise one or more condensing tubes and/or heat sinks, such that a distilled liquid is delivered to the collector 48. The capture device 46 can be operated to ensure that excessive vapor buildup does not lead to pressures within the vessels 14 rising above atmospheric pressure. Vapors may be prevented from escaping the vessels 14 until valves (not shown) are opened to allow the vapors to escape to the vapor collector 48, where the vapors may be condensed, aggregated, and then forwarded to the outlet 20 or recycled back to any one or more of the vessels 14.

Figures 3, 4, 5:
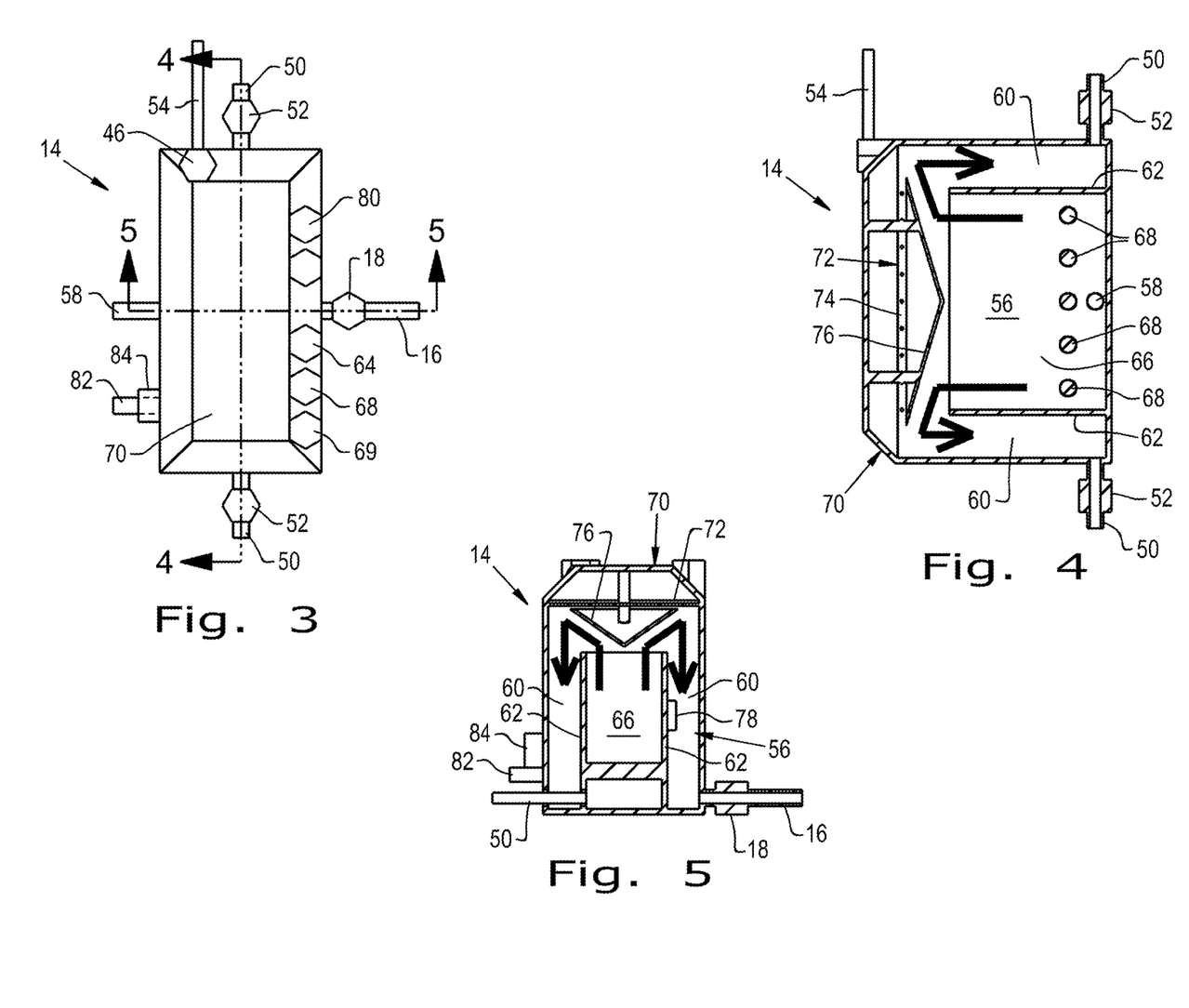

An individual distillation vessel 14 is represented with three views in FIGS. 3, 4, and 5. Various different materials can be used in the construction of the vessels 14 that are capable of withstanding the temperatures, pressures, and chemical environments within and surrounding the vessels 14. Nonlimiting examples include stainless steels or hardened polymers, for example, polyvinyl chloride ("PVC") or a high-density polyethylene ("HDPE") material. As previously noted, each vessel 14 is equipped with an inter-vessel pipe 16 that connects the vessel 14 to an immediately adjacent vessel 14, and each vessel 14 is also connected to at least one channel 24, represented in FIGS. 1 through 4 as being through a second pipe 50 equipped with a valve 52. Each vessel 14 is also connected to the vapor collector 48 with a third pipe 54. The pipes 16 and 50, channels 24, and their valves 18, 26, and 52 enable the flow from any vessel 14 in the series of vessels 14 to be routed to any downstream vessel 14 in the series, and enable flow from any vessel 14 in the series to be routed to the outlet 20 of the series.

As seen in FIGS. 4 and 5, each vessel 14 defines an interior chamber 56, which is preferably completely closed and airtight except for the aforementioned pipes 16, 50, and 54. The feedstock (if the vessel 14 is the first vessel 14a) or a liquid distilled therefrom (if the vessel 14 is one of the downstream vessels 14b-f) enters the vessel 14 through an inlet 58 formed by either an inter-vessel pipe 16 or, if the vessel 14 is the first vessel 14a in the series, a pipe connected to the holding tank 38. The amount of feedstock or liquid in the vessel 14 delivered to the vessel 14 is controlled so that the level is lower than one or more walls 62 within the vessel 14 that define one or more condensation collection gutters 60. The chamber 56 also contains a reservoir 66 that receives the feedstock or liquid from the inlet 58 and thereafter contains the feedstock or liquid undergoing evaporation. The level of feedstock or liquid in the reservoir 66 can be sensed with one or more limit switches 64 to permit the flow of feedstock or liquid into the vessel 14 to be controlled through the control unit. One or more limit switches may also be used to determine if the level of residual feedstock (i.e., the matter (e.g., contaminants) in the feedstock that remains after the bulk of the liquid has been removed) in the reservoir 66 is at such a level that the residual feedstock should be removed from the reservoir 66. For this purpose, FIG. 5 represents the vessel 14 as being further equipped with a residual feedstock discharge pipe 82 through which residual feedstock can be pumped out of the reservoir 66 for proper disposal. FIG. 5 also represents the vessel 14 as equipped with a cleanout 84 through which the interior of the vessel 14, including its reservoir 66, can be cleaned with suitable equipment.

For the purpose of heating the contents of the reservoir 66, the vessel 14 is equipped with any suitable heating means 68 capable of sufficiently heating the feedstock or liquid and surviving the chemical environment within the vessel 14. Examples of suitable heating means 68 include one or more conventional water heating elements that are rated at sufficient wattage to sustain the current through the feedstock or liquid and heat the volume of feedstock or liquid to the desired temperature. Additionally, multiple heating elements can be implemented for initiating flash evaporation, and secondary heaters may be used to maintain the feedstock or liquid at a constant temperature once the feedstock or liquid is initially heated to a sufficient temperature to initiate evaporation. One or more temperature sensors 69 can be used to monitor the temperature of the feedstock or liquid within the reservoir 66 of the vessel 14, as well as other temperatures within the vessel 14.

To promote the evaporation process, the vessel 14 can also be equipped with an agitation means 78 (FIG. 5) to disrupt surface tensions that may inhibit vapor from leaving the body of feedstock or liquid in the reservoir 66. Any suitable agitation means 78 can be used to apply a high frequency vibration to the feedstock or liquid in the internal reservoir 66 of a vessel 14. For example, frequency emitters or vibrators can be positioned on the exterior of a vessel 14 to alter and reduce the tensile strength of the feedstock or liquid surface within the reservoir 66, thus allowing vapor bubbles to more easily escape and thereby increase the volume rate of distilled liquid produced by the vessel 14 as well as reducing its energy costs. Alternatively or in addition, a low pressure air induction system (not shown) may be used in conjunction with the vacuum pump 44 to introduce air bubbles into the feedstock or liquid in the reservoir 66 that have the effect of further increasing bubbling and agitation in the reservoir 66.

The upper end of the chamber 56 is closed by a lid 70, which defines or supports a surface 72 that serves as a condensation surface for vapors generated within the chamber 56. The surface 72 is shown as being planar and horizontal, which is believed to be an optimal orientation and configuration for promoting condensation, though surfaces having other shapes could be used. Cooling means 74 is incorporated into the surface 72 to promote condensation of the vapors that were generated by heating the feedstock or liquid. Suitable cooling means 74 generally encompass any device capable of sufficiently reducing the temperature of the vapor to initiate condensation, and may include heat exchangers and electronic cooling devices. FIGS. 4 and 5 show the chamber 56 of the vessel 14 as containing a baffle 76 that slopes downward toward the center of the chamber 56, and conversely slopes upward to the outer periphery of the chamber 56, for example, as a result of the baffle 76 having a pyramidal or cone shape. The baffle 76 serves to direct the vapors outward and upward toward the surface 72 cooled by the cooling means 74, so that the vapors contact and condense on the surface 72, after which the resulting condensation is able to flow by gravity downward into the condensation collection gutters 60. The cooling means 74 can be controlled manually or with the control unit.

In an automated process, an appropriate amount of feedstock or liquid can be maintained in the reservoir 66 by the control unit using the output of the limit switches 64. The control unit can also be used to control the heating means 68 to evaporate liquid from the feedstock or liquid at a desired rate, and to control the cooling means 74 to condense the resulting vapor at an appropriate rate. In addition, the control unit can be used to open and close any of the valves 18, 26 and 52 as well as open and close the inlet 58 to the vessel 14 as may be desired or needed during the operation of the vessel 14 to control the flow of distilled liquid directly to a downstream vessel 14b-f via the pipe 16 or to the channel 24 via the pipe 50.

Due to the process of evaporation, the condensation collected in the gutters 60 is free of at least some of the contaminants originally present in the feedstock or liquid, yielding a distilled liquid portion that may be suitable for immediate use or may require further distillation in a downstream vessel 14 before it is suitable for its intended use. Consequently, from the gutters 60 the distilled liquid portion may be delivered to the next vessel 14 in the series via their shared inter-vessel pipe 16 for further distillation, or routed via its pipe 50 to the channels 24 to bypass the next vessel 14 and instead deliver the distilled liquid portion to a vessel 14 farther along the series for further distillation, or routed via its pipe 50 to one of the channels 24 for direct delivery to the outlet 20 of the series of vessels 14. Transfer of the distilled liquid portion via the pipes 16 and 50 can be achieved with any suitable pump 80.

It should be appreciated that various levels of purification can be achieved by selecting the number of vessels 14 that a distilled liquid must pass through before exiting the series of vessels 14 through the system exit 20. Moreover, certain vessels 14 may be operated at different parameters to promote the distillation process with respect to one or more known or suspected contaminants in the feedstock. By operating all of the vessels 14 in series, a maximum level of purification can be attained for the distillation system 10, for example, to produce potable water. However, in some cases fewer than all of the vessels 14 would be necessary to produce a treated liquid suitable for an intended purpose, for example, nonpotable water intended for agricultural uses. In the latter case, the distilled liquid produced by the vessels 14 can be analyzed to determine which downstream vessels 14 are unnecessary to achieve the desired purification level.

In view of the above, it can be appreciated that a suitable control unit may use predetermined programs to maintain appropriate process parameters, including but not limited to temperature and pressure, depending on the characteristics of the feedstock and any distilled liquid portion produced by any given vessel 14. Such characteristics may include the amounts and types of contaminants detected in the feedstock or distilled liquid portion, and may be sensed using one or more appropriate analyzers. The control unit can be remotely controlled using a Wireless Internet Protocol, such as WAP, XHTML, and LAN, allowing a user to monitor and control the system 10 without being physical present at the site where the system 10 is located. If desired, a smart phone or other mobile electronic device can run an application that displays the control panel 32 and its various displayed information so that an operator can remotely identify a device operating outside its prescribed range or exhibiting an operating anomaly, and enable the operator to take corrective steps that may include remotely shutting down the system 10.

Figure 6:
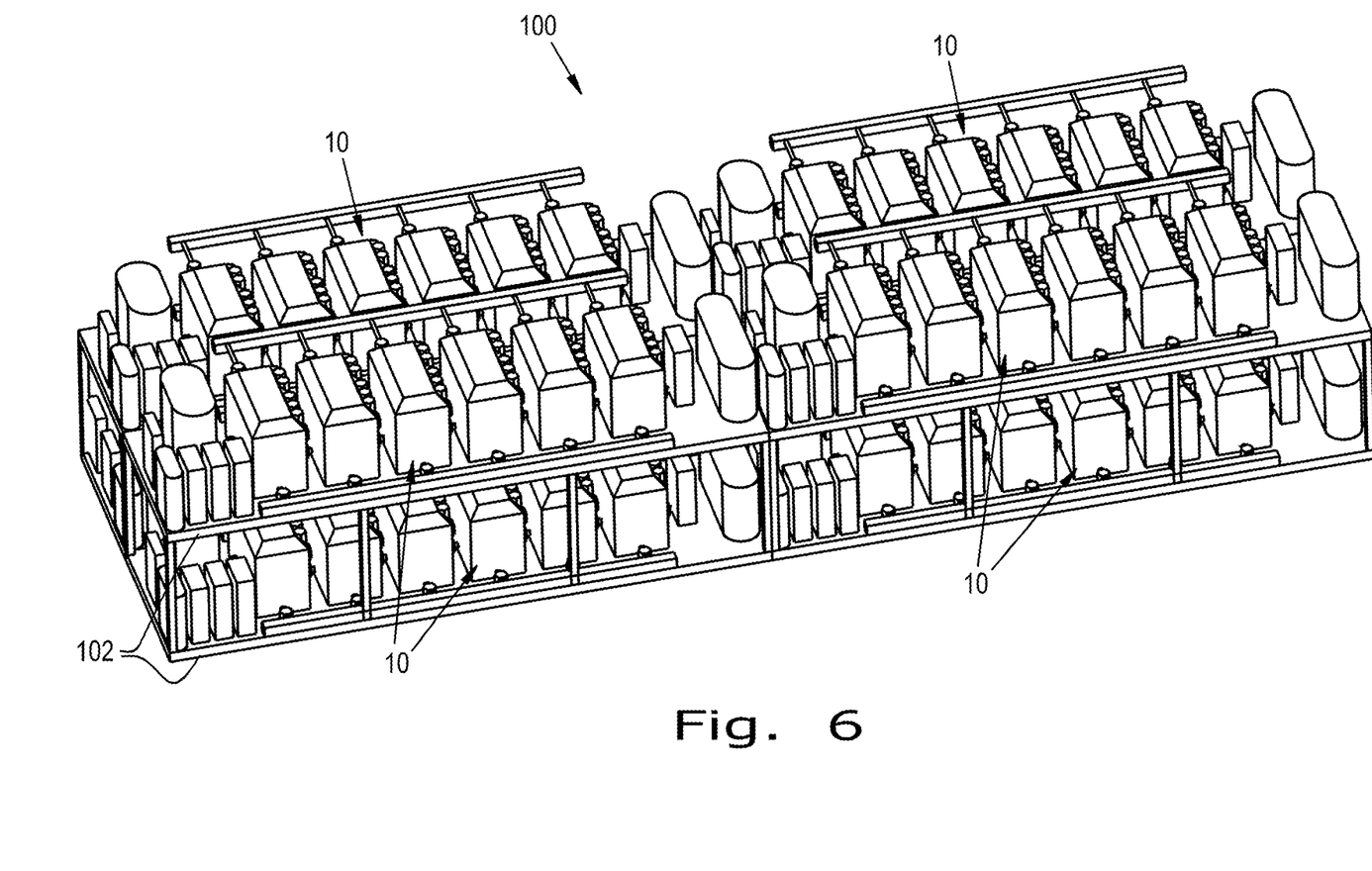
FIG. 6 schematically represents a perspective view of a modular system comprising a plurality of the distillation system of FIGS. 1 and 2 in accordance with a nonlimiting embodiment of the present invention.
Figure 7:
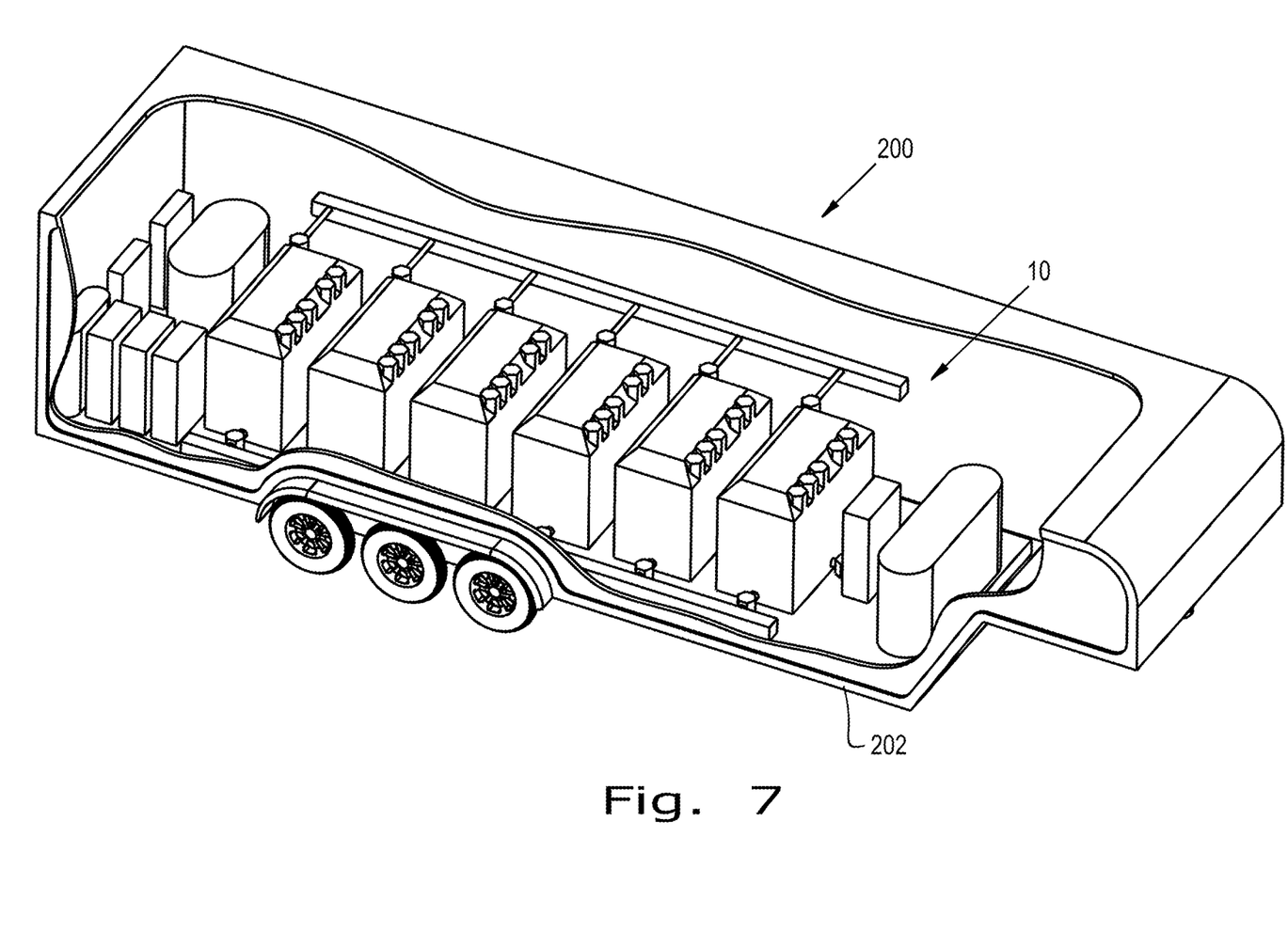
FIG. 7 schematically represents a perspective view of a mobile system comprising the distillation system of FIGS. 1 and 2 in accordance with a nonlimiting embodiment of the present invention.

FIGS. 6 and 7 schematically represent a distillation system 10 of the types represented in FIGS. 1 and 2 as a unit incorporated into, respectively, a modular system 100 and a mobile system 200. In FIG. 6, multiple distillation systems 10 are combined end-to-end and on top of each other and supported by a frame 102, such that each system 10 is an independent unit of the modular system 100. Each system 10 or components thereof can be skid-mounted to facilitate the modularity and scalability of the system 100. As such, any of the distillation systems 10 can be operated, shut down, or removed, as can any component of any one or more of the systems 10 (for example, a vessel 14). In FIG. 7, a single distillation system 10 is shown installed within an enclosed trailer 202 equipped with wheels to enable the system 10 to be readily transported from one site to another. By sealing the trailer 202, the vacuum pump 44 can be used to reduce the pressure within the interior of the trailer 202 instead of or in addition to reducing the pressures within the vessels 14 to sub-atmospheric pressures. The mobile system 200 of FIG. 7 offers versatilely while also providing considerable processing capacity, as a nonlimiting example, approximately 30,000 to 50,000 gallons of treated liquid per day. Larger modular systems of the types represented in FIG. 6 can produce substantially greater volumes of treated liquid. On the other hand, the mobile system 200 allows a user to transport the system 200 to areas that would not normally be able to produce a purified liquid from an existing feedstock without having a permanent purification system and infrastructure in place, or alternatively, transporting the feedstock from another location. This aspect is particularly advantageous when the feedstock is a finite amount of contaminated water that does not require or warrant a permanent water purification plant.

The systems 10, 100 and 200 described above also offer the advantages of minimal loss of productivity or downtime, the avoidance of requiring additives, carrier gases, airborne contaminants, combustible compounds, etc., in the distillation process, and the ability to remove a broad range of contaminants, including suspended solids, dissolved solids, immiscible liquids, heavy metals, chemicals, bacteria, and viruses that are commonly found in wastewater, tracking water, seawater, storm water, fertigation, and industrial waste.

While the invention has been described in terms of specific or particular embodiments, it should be apparent that alternatives could be adopted by one skilled in the art. For example, the systems 10, 100, and 200 and their components could differ in appearance and construction from the embodiments described herein and shown in the drawings, functions of certain components of the systems 10, 100, and 200 could be performed by components of different construction but capable of a similar (though not necessarily equivalent) function, process parameters such as temperatures and pressures could be modified, and appropriate materials could be substituted for those noted. In addition, the invention encompasses additional or alternative embodiments in which one or more features or aspects of the disclosed embodiments could be eliminated. Accordingly, it should be understood that the invention is not necessarily limited to any embodiment described herein or illustrated in the drawings. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. A system for treating a feedstock containing a liquid and at least first and second contaminants to remove the first and second contaminants therefrom, the system comprising:
   a series of vessels that are fluidically connected in series, the series of vessels comprising a first vessel and at least a second vessel downstream of the first vessel, each of the first and second vessels comprising an interior chamber in which is defined a reservoir configured to receive and contain the feedstock, a heating element for heating the feedstock contained in the reservoir to evaporate the liquid therefrom, a condensation surface above the reservoir, and a collecting means arranged and configured for collecting condensation flowing by gravity from the condensation surface;
   means for delivering the feedstock to the reservoir of the first vessel to produce with the heating element and the condensation surface thereof a condensation of a first portion of the liquid of the feedstock in the reservoir of the first vessel, and then collect the condensation with the collecting means thereof to separate the first portion from the first contaminant and leave in the first vessel a first residual portion of the feedstock;
   means for delivering the first portion of the liquid to the reservoir of the second vessel to produce with the heating element and the condensation surface thereof a condensation of a second portion of the liquid of the feedstock in the reservoir of the second vessel, and then collect the condensation with the collecting means thereof to separate the second portion from the second contaminant and leave in the second vessel a second residual portion of the feedstock; and
   means for removing the second portion of the liquid from the collecting means of the second vessel.

2. The system according to claim 1, further comprising means for reducing pressures within the first and second vessels to less than atmospheric pressure so as to reduce the temperature at which the liquid evaporates from the feedstock relative to a boiling temperature at which the liquid evaporates from the feedstock at atmospheric pressure.

3. The system according to claim 1, further comprising means for filtering the feedstock prior to delivering the feedstock to the first vessel.

4. The system according to claim 1, further comprising means for filtering the second portion of the liquid to yield a treated portion and means for delivering the treated portion to a destination.

5. The system according to claim 1, wherein the series of vessels comprises at least a third vessel and the system further comprises:
   means for delivering the second portion of the liquid to the third vessel;
   means for heating the second portion of the liquid in the third vessel to evaporate a third portion of the liquid and thereby separate the third portion from a third contaminant of the feedstock; and
   means for condensing and removing the third portion of the liquid from the third vessel so as to leave therein a third residual portion of the feedstock.

6. The system according to claim 5, further comprising means for bypassing the second vessel and instead delivering the first portion of the liquid to the third vessel.

7. The system according to claim 1, further comprising means for cooling the condensation surface of each of the first and second vessels to promote condensation of the first and second portions of the liquid within the first and second vessels.

8. The system according to claim 7, wherein the condensation surface of each of the first and second vessels is a horizontal surface of a lid thereof that encloses the first and second vessels.

9. The system according to claim 8, further comprising at least one baffle located in the first and second vessels that deflect vapors within the first and second vessels away from the horizontal surface of the lid and toward sides of the first and second vessels.

10. The system according to claim 1, further comprising a discharge channel into which the first and second portions of the liquid flow from the first and second vessels.

11. The system according to claim 1, further comprising means for agitating the feedstock in the first vessel and the first portion of the liquid in the second vessel to promote evaporation of the first and second portions of the liquid within the first and second vessels.

12. The system according to claim 1, wherein the heating elements of the first and second vessels are effective to remove elements of the periodic table, salt and other naturally-occurring and synthetic inorganic compounds, oils, organic compounds, volatile compounds, radioactive particles, bacteria, and viruses from the feedstock.

13. The system according to claim 1, wherein the system is a mobile system having wheels for transporting the mobile system to different geographic sites.

14. The system according to claim 1, wherein the system is a modular system comprising the series of vessels and further comprising a second series of vessels for treating the feedstock that is in fluidic parallel with the series of vessels.

15. The system according to claim 1, wherein the system is located adjacent a source of the feedstock.

16. The system according to claim 1, wherein the system is located adjacent or is connected to a river, lake, irrigation system, mechanical equipment, or a municipal water system.

* * * * *